United States Patent Office 3,414,559
Patented Dec. 3, 1968

3,414,559
BENZOTHIAZOLE AZO DYES
Mario Francesco Sartori, Wilmington, Del., assignor to E. I. du Pont de Nemours and Company, Wilmington, Del., a corporation of Delaware
No Drawing. Continuation-in-part of application Ser. No. 274,338, Apr. 19, 1963. This application Oct. 11, 1965, Ser. No. 494,875
6 Claims. (Cl. 260—158)

ABSTRACT OF THE DISCLOSURE

Water-soluble cationic, and water-insoluble pendant tertiary amino, benzothiazole azo dyes which can be used in the dyeing of acid-modified acrylic and acid-modified polyester fibers. The following formula illustrates the basic benzothiazole azo structure of these dyes:

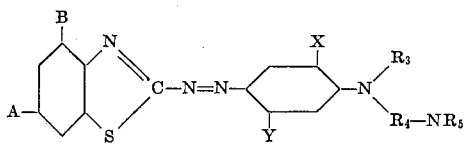

wherein

A is H, $CH_3$, lower alkoxy, Cl, Br, $NO_2$, CN, $CF_3$, R—CO—, R—$SO_2$—, $R_1R_2NSO_2$— or lower alkyl-O—CO— with the proviso that when B is H, $CH_3$ or lower alkoxy then A is Cl, Br, $NO_2$, CN, $CF_3$, R—CO—, R—$SO_2$—, $R_1R_2NSO_2$— or lower alkyl-O—CO—;
R is lower alkyl, $CF_3$, cyclohexyl, 2-hydroxyethyl, and phenyl which may be substituted with Cl, Br, $NO_2$, or lower alkyl;
$R_1$ is H, lower alkyl, or 2-hydroxyethyl;
$R_2$ is a lower alkyl, 2-hydroxyethyl, benzyl, or phenyl radical;
B is H, $CH_3$, lower alkoxy, Cl, Br, $NO_2$, or CN with the proviso that when A is H, $CH_3$ or lower alkoxy then B is Cl, Br, $NO_2$ or CN;
X is H, Cl, Br, $CH_3$, $C_2H_5$, or lower alkoxy;
Y is $NH_2$, H, Cl, Br, $CH_3$, $C_2H_5$, lower alkoxy, QCONH— or $QSO_2NH$—, wherein Q is lower alkyl, or phenyl which may be substituted with Cl, Br, $NO_2$, or lower alkyl with the proviso that when Y is $NH_2$ then X is Cl, Br, $CH_3$, $C_2H_5$ or lower alkoxy;
$R_3$ is H, lower alkyl, 2-hydroxyethyl, 2-cyanoethyl or lower alkoxyalkyl;
$R_4$ is an alkylene radical of 2 to 4 C-atoms;
$NR_5$ represents

wherein $R_6$ is lower alkyl, 2-hydroxyethyl, or benzyl;
$R_7$ is lower alkyl, 2-hydroxyethyl, or benzyl;
$R_8$ is lower alkyl, 2-hydroxyethyl, or benzyl;
$A^-$ is a water-solubilizing anion such as a chloride ion, a bromide ion, a lower alkyl sulfate ion, a zinc trichloride ion, a p-toluene sulfonate ion, and the like.

The dyes are used in the dyeing of acid-modified acrylic fibers and acid-modified polyester fibers.

This application is a continuation-in-part of my co-pending application Ser. No. 274,338, filed Apr. 19, 1963, now abandoned.

The invention disclosed herein relates to water-soluble, cationic monoazo dyes, and to water-insoluble basic azo dyes.

Cationic monoazo dyes are used in the dyeing of acid-modified acrylic fibers. For example, cationic dyes may be used to dye the sulfonate-modified acrylic fibers described in U.S. Patents 2,837,500 and 2,837,501. Also, such dyes may be used on acid-modified polyester fibers such as the polyethylene terephthalate fibers containing metal sulfonate groups. These polyethylene terephthalate fibers are described in U.S. Patent 3,018,272. Fibers such as these are frequently referred to as anionic fibers.

Since dyes are seldom applied in self shades, it is important to provide a spectrum of dyes whose individual members have comparable dyeing rates. When a given dye is mixed or formulated with one or more dyes to match a particular hue, for example, one that may be required for a fashion shade, the dyeing rates of the component dyes are a meter of special consideration. If dyes possessing widely different dyeing rates are employed in such formulations, shade control becomes difficult.

One well-known method of expressing the dyeing rate of a particular dye is in terms of its "T/2 value." The T/2 value for a particular dye is the time in minutes for a given fiber to absorb half as much dye by weight as it would absorb if dyed to equilibrium. Generally speaking, for commercial dyes the amount of dye absorbed in the fiber when dyeing is carried to equilibrium should be at least 80% of the dye employed in the dye bath, and preferably more than 90%. The method of determining the T/2 value of any given dye will be set forth in more detail hereinafter.

The T/2 values for a spectrum of commercial cationic dyes for acid-modified acrylic fibers vary from about 10–32 minutes. Dyes with T/2 values appreciably outside of this range are difficult to use in formulation with standard commercial dyes to provide a range of fashion shades. For example, a dye having a T/2 value of about 40 or higher would not exhaust onto the fiber as fast as the commercial dye with which it is being used, and thus there is difficulty in controlling the shade. Prior to the present invention, there existed a need for cationic monoazo dyes having T/2 values within the range of most commercial cationic dyes and which, in addition, will exhaust well when employed in formulations for the dyeing of acid-modified acrylic fibers and acid-modified polyester fibers.

The present invention provides new bright cationic monoazo dyes which possess dyeing rates that make them suitable for use with other commercial cationic dyes for acid-modified acrylic and acid-modified polyester fibers. These new dyes possess good exhaust properties in the dye bath, and they dye acid-modified acrylic and polyester fibers in strong and fast shades which are characterized by stability of the shade over a wide range of pH variations of the dye bath, particularly in the region from pH 3 to pH 9. That is to say, the shade of the dyeing does not change perceptibly with change in the H-ion concentration in the pH range indicated.

Recently it has been found that basic dye bases may be applied effectively to anionic fibers at temperatures of about 100° C. to 230° C. when the pH is sufficiently basic to maintain the dye in essentially water-insoluble form, and the fiber is modified to contain selected cations. The present invention also provides new basic dye bases, more specifically pendant tertiary amino monoazo dyes, for application to anionic fibers by the aforementioned process. The new dyes may be applied in padding or printing operations, and afford colorations which possess good lightfastness, shade stability and sublimation properties.

The compounds of this invention have the following formula:

(I) 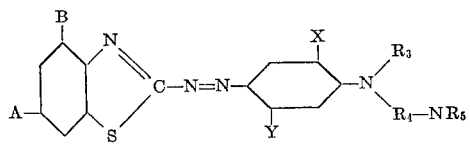

wherein

A is a member of the group consisting of H, CH₃, lower alkoxy, Cl, Br, NO₂, CN, CF₃, R—CO—, R—SO₂—, R₁R₂NSO₂— and lower alkyl-O—CO— with the proviso that when B is H, CH₃ or lower alkoxy then A is a member of the group consisting of Cl, Br, NO₂, CN, CF₃, R—CO—, R—SO₂—, R₁R₂NSO₂— and lower alkyl-O—CO;

R is a member of the group consisting of lower alkyl, CF₃, cyclohexyl, 2-hydroxyethyl, and phenyl which may be substituted with Cl, Br, NO₂, and lower alkyl;

R₁ is a member of the group consisting of H, lower alkyl, and 2-hydroxyethyl;

R₂ is a member of the group consisting of a lower alkyl, 2-hydroxyethyl, benzyl, and phenyl radical;

B is a member of the group consisting of H, CH₃, lower alkoxy, Cl, Br, NO₂ and CN with the proviso that when A is H, CH₃ or lower alkoxy then B is a member of the group consisting of Cl, Br, NO₂ and CN;

X is a member of the group consisting of H, Cl, Br, CH₃, C₂H₅, and lower alkoxy;

Y is a member of the group consisting of NH₂, H, Cl, Br, CH₃, C₂H₅, lower alkoxy, QCONH— and QSO₂NH—, wherein Q is a member of the group consisting of lower alkyl, or phenyl which may be substituted with Cl, Br, NO₂, and lower alkyl with the proviso that when Y is NH₂ then X is a member of the group consisting of Cl, Br, CH₃, C₂H₅, and lower alkoxy;

R₃ is a member of the group consisting of H, lower alkyl, 2-hydroxyethyl, 2-cyanoethyl and lower alkoxyalkyl;

R₄ is an alkylene radical of 2 to 4 C-atoms;

NR₅ represents a member selected from the group consisting of
$$\overset{+}{NR_6R_7} \text{ and } \overset{+}{NR_6R_7R_8}, A^- \text{ wherein}$$

R₆ is a member of the group consisting of lower alkyl, 2-hydroxyethyl, and benzyl;

R₇ is a member of the group consisting of lower alkyl, 2-hydroxyethyl, and benzyl;

R₈ is a member of the group consisting of lower alkyl, 2-hydroxyethyl, and benzyl;

A⁻ is a water-solubilizing anion such as a chloride ion, a bromide ion, a lower alkyl sulfate ion, a zinc trichloride ion, a p-toluene sulfonate ion, and the like.

In the above formula, the term "lower alkyl" is intended to include alkyl radicals of from 1 to 4 C-atoms. Examples of specific dyes coming within this invention and ones that are preferred are.

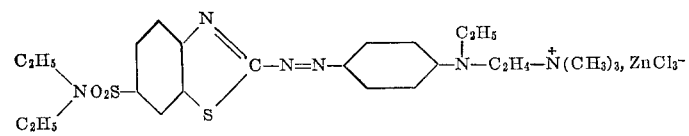

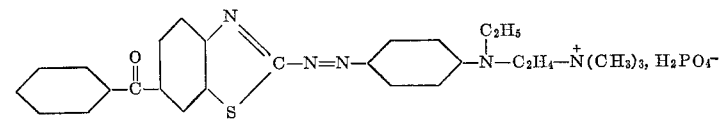

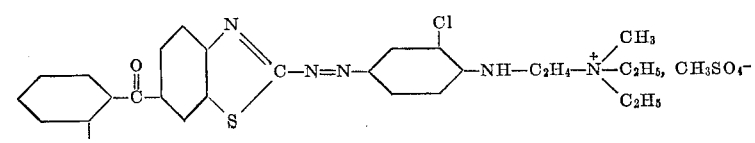

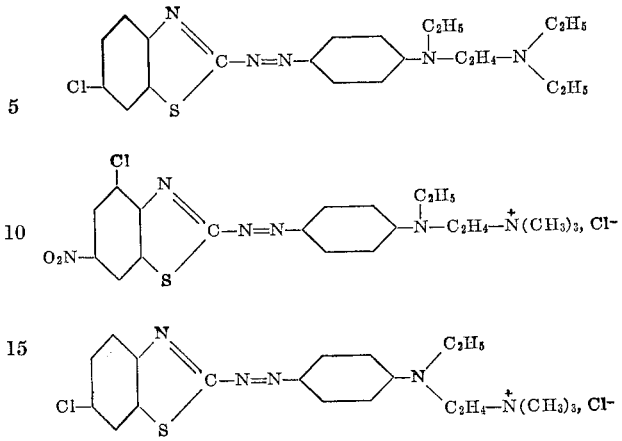

The novel compounds of this invention may be prepared by diazotizing the desired 2-amino-4 and/or 6-substituted benzothiazole, coupling in acid solution to the chosen aryl amine, and isolating the product. It is usually convenient to isolate the cationic dyes by complexing with zinc chloride as illustrated in some of the examples. Although the filtrations are generally slower when zinc chloride is not used, the cationic dyes of this invention can be isolated by salting with water-soluble salts such as NaCl, Na₂SO₄, KCl, K₂SO₄, NaBr, KBr, and the like.

The basic dye bases are generally isolated from the coupling reaction mass by filtration. The resulting filter cake is stirred in water, the solution or slurry is made alkaline, and the precipitated dye is filtered off, and washed.

For a clearer understanding of the invention, the following specific examples are given. These examples are intended to be merely illustrative of the invention and not in limitation thereof. Unless otherwise specified, all parts are by weight.

Example I (a) 12.8 parts of 2-amino-N,N-dimethyl-6-benzothiazolesulfonamide, prepared as described in Archiv der Pharmazie, 279, 194 (1941), are dissolved at 20° C. in a mixture of 50 parts of 85% phosphoric acid and 40 parts of acetic acid. 3.8 parts of finely ground sodium nitrite are added to the agitated solution at 5° C. over a period of 0.5 hour and agitation is continued for 2 hours at 5° C. The resulting diazo solution is then added during 0.5 hour to a stirred solution of 12.1 parts of [2-(N-ethylanilino)ethyl]trimethylammonium chloride in 24 parts of aqueous acetic acid (1:1), while keeping the temperature at 2°–5° C. The acidity of the reaction mixture is reduced to pH 5 by addition of sodium acetate, and agitation is continued for 5 hours at 5° C. and 10 hours at 20°–25° C. The resulting cationic dye is salted out by adding an excess of 20% zinc chloride aqueous solution. The precipitate is filtered off and dried. The product thus obtained has the formula:

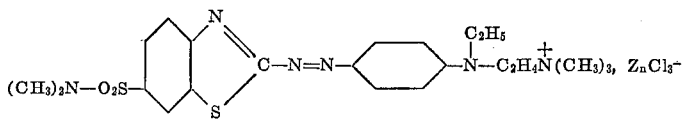

It is a dark red powder which dissolves in water, giving a red solution. The absorption maximum in methanol is located at 510 millimicrons. It exhausts well from the dyebath and dyes acid-modified acrylic fibers in bluish-red shades of good fastness properties. Following the dyeing procedure of Example IV, the time of half-dyeing ($T/2$) is 32 minutes.

(b) When the coupling component employed in part (a) of this example is replaced with a chemical equivalent amount of [3-(N-ethyl-m-toluidino)propyl]diethylmethylammonium methosulfate, a dye having similar shade, fastness, and dyeing properties is obtained. The $T/2$ value for this dye is 30 minutes.

(c) When the diazo component employed in part (a) of this example is replaced with the chemical equivalent amount of 2-amino-N,N-diethyl-6-benzothiozolesulfonamide, a dye having similar shade, fastness, and dyeing properties is obtained. The $T/2$ value for this dye is 31 minutes.

(d) When the diazo component employed in part (a) of this example is replaced with the chemical equivalent amount of 2-amino-N,N-di-propyl-6-benzothiozolesulfonamide, a dye having similar shade, fastness, and dyeing properties is obtained. The $T/2$ value for this dye is 28 minutes.

Example II

A diazo solution prepared from 12.8 parts of 2-amino-N,N - dimethyl - 6 - benzothiozolesulfonamide by the procedure described in Example I is added during 0.5 hour to a stirred solution of 17.6 parts of [2-(o-chloroanilino)ethyl]diethylmethylammonium methosulfate in 20 parts of water, while keeping the temperature at 2°–3° C. When the coupling reaction is completed, the dye is isolated by salting with sodium chloride and filtering. This dye has the formula:

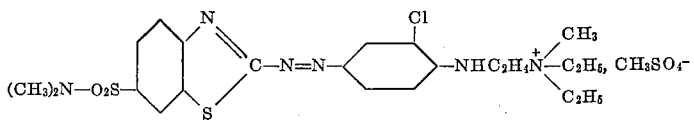

and dyes acid-modified acrylic fibers red-orange shades having good fastness properties.

Example III (a) 3.3 parts of 2 - amino - N - ethyl-N-phenyl-6-benzothiazolesulfonamide, prepared by condensing 2-amino-6-benzothiazolesulfonyl chloride with N-ethylaniline, are dissolved at 20° C. in a mixture of 11 parts of 85% phosphoric acid and 15 parts of acetic acid. The solution is cooled to 5° C., and 0.7 part of finely ground sodium nitrate is slowly added while stirring. The diazo solution thus obtained is added to a stirred solution of 2.5 parts of [2 - (N - ethylanilino)ethyl]trimethylammonium chloride in 12 parts of water, while keeping the temperature at 2°–3° C. Sodium acetate is then added in sufficient amount to reduce the acidity to pH 4–5, and stirring is continued for 2 hours at 5° C. and for 10 hours at 20°–25° C. After precipitating the dye, by adding a 20% aqueous solution of zinc chloride, it is filtered off and dried. The product thus obtained is the zinc chloride complex of the dye. It has the formula:

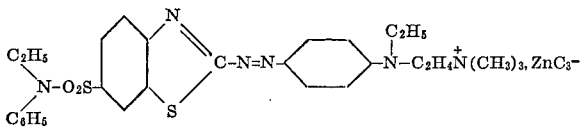

It is a dark red powder which dissolves in methanol, in which solution the absorption maximum is located at 510 millimicrons. It dyes acid-modified acrylic fibers bluish-red shades of good fastness properties. Following the dyeing procedure of Example IV, the time of half-dyeing is 30 minutes.

(b) When the coupling component used in part (a) of this example is replaced with an equivalent amount of [2 - (o - chloroanilino)ethyl]diethylmethylammonium methosulfate, a red-orange dye of similar properties is obtained.

Example IV

A 200-ml. aqueous dyebath is prepared which contains the following:

| | Gram |
|---|---|
| Dye | 0.05 |
| Alkyl ($C_{12-16}$) trimethylammonium bromide | 0.06 |
| Sodium sulfate | 0.50 |
| The condensation product of 20 mols of ethylene oxide with 1 mol of $C_{18}$ alcohol | 0.015 |

The pH is adjusted to 4.5 by adding acetic acid, and the temperature of the dyebath is raised to 206° F. A 5 ml. sample is taken from the dyebath and coded No. 1.

5 grams of acid-modified acrylic fiber are placed in the dyebath and agitated therein for 120 minutes. During this time, 5 ml. samples of the dyebath liquor are removed, at 5, 10, 15, 30, 60, and 120 minute intervals. These samples or coded No. 2 to No. 7, respectively.

The seven samples are examined on a spectrophotometer and the percent of dye exhausted from the dyebath at each interval of time is determined. By plotting percent exhaustion against time, one observes the time at which the dyeing process reaches equilibrium. The $T/2$ value (time of half-dyeing) is the time in minutes required for the fiber to absorb half as much dye as it absorbs at equilibrium.

By following the procedure of Example I, and employing the diazo and coupling components shown in the following table, cationic dyes for acid-modified acrylic and polyester fibers are obtained which possess outstanding fastness, exhaust, and dyeing properties.

| Diazo Component | Coupling Component |
|---|---|
| (a) 2-amino-N,N-dibutyl-6-benzothiazolesulfonamide. | [2-(N-methyl-3-ethylanilino)ethyl]trimethylammonium chloride. |
| (b) 2-amino-N-ethly-6-benzothiazolesulfonamide. | [2-(N-butyl-m-anisidino)ethyl]triethylammonium chloride. |
| (c) amino-N-butyl-N-methyl-6-benzothiazolesulfonamide. | Butyldimethyl[2-(N-n-propyl-2,5-dichloroanilino)ethyl] ammonium chloride. |
| (d) 2-amino-N-benzyl-N-ethyl-6-benzothiazolesulfonamide. | [2-(N-2-hydroxyethyl-2-chloro-5-methylanilino)ethyl]trimethylammonium chloride. |
| (e) 2-amino-N-benzyl-6-benzothiazolesulfonamide. | Benzyldimethyl[2-(N-2-cyanoethylanilino)ethyl]ammonium chloride. |
| (f) 2-amino-N-phenyl-6-benzothiazolesulfonamide. | [2-(N-ethyl-2-chloro-5-methoxyanilino)ethyl]-2-hydroxyethyldimethylammonium chloride. |
| (g) 2-amino-N-benzyl-N-methyl-6-benzothiazolesulfonamide. | Diethylmethyl[2-(o-anisidino)-ethyl]ammonium methosulfate. |
| (h) 2-amino-N-isopropyl-N-methyl-6-benzothiazolesulfonamide. | Diethylmethyl[2-(5-chloro-o-anisidino)ethyl]ammonium methosulfate. |
| (i) 2-amino-N-isobutyl-6-benzothiazolesulfonamide. | Diethylmethyl[2-(2,5-dimethoxyanilino)ethyl]ammonium methosulfate. |
| (j) 2-amino-N,N-diethyl-6-benzothiazolesulfonamide. | Diethylmethyl[2-(5-methyl-o-anisidino)ethyl]ammonium methosulfate. |

| Diazo Component | Coupling Component |
| --- | --- |
| (k) 2-amino-N,N-diethyl-6-benzothiazolesulfonamide. | [2-(N-ethylanilino)-1-methylethyl]trimethylammonium chloride. |
| (l) 2-amino-N,N-diethyl-6-benzothiazolesulfonamide. | [3-(N-methyl-m-toluidino)-2-methylpropyl]trimethyl ammonium chloride. |
| (m) 2-amino-N-sec-butyl-6-benzothiazolesulfonamide. | [4-(N-ethyl-m-anisidino)butyl]trimethylammonium chloride. |
| (n) 2-amino-N,N-dimethyl-6-benzothiazolesulfonamide. | Diethylmethyl[3-(N-ethyl-m-toluidino)propyl]ammonium methosulfate. |
| (o) 2-amino-N,N-dipropyl-6-benzothiazolesulfonamide. | [2-(N-ethylanilino)ethyl]trimethylammonium chloride. |

Example V (a) A solution of 2.5 parts of 2-amino-6-benzoylbenzothiazole, M.P. 254° C. (prepared from p-aminobenzophenone by following a method similar to that described in Annalidi Chimica 45, 172 (1955) for preparing 6-acetyl-2-aminobenzothiazole) in 50 parts of 85% phosphoric acid is cooled to —5° C. A solution of 0.7 parts of sodium nitrite in 10 parts of water is added slowly to the agitated cold acid solution and the resulting mixture is stirred at —5°C. for 2 hours. The diazotization mixture is then added to a cold (—5° C.) solution of 2.45 parts of [2-(N-ethylanilino)ethyl]trimethylammonium chloride in 15 parts of water, while keeping the temperature at 0°–2° C. After stirring 2 hours at 0°–20° C. the acidity of the reaction mixture is reduced to pH 2–4 by addition of 15% caustic solution and the agitation is continued for 5 hours at 5° C. and then for 10 hours at 20°–25° C. The precipitated dye is filtered off and dried. The product thus obtained has the formula:

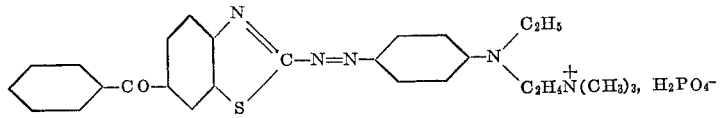

It is a dark red powder, which dissolves in water, giving a red solution. The absorption maximum in methanol is located at 510° millimicrons. It exhausts well from the dyebath and dyes acid-modified acrylic fiber in bright red shades of good fastness properties. Following the dyeing procedure of Example IV the time of half-dyeing ($T/2$) is 15–18 minutes. The shade of this dye does not change by varying the pH of the dyebath from 3 to 10.

(b) When the coupling component in part (a) of this example is replaced with a chemical equivalent amount of [2 - (o - chloroanilino)ethyl]diethylmethylammonium methosulfate, an orange dye of similar fastness and dyeing properties is obtained.

Example VI (a) A solution of 2.29 parts of 2-amino-4-chloro-6-nitrobenzothiazole, M.P. 304° C. (prepared by nitration of 2-amino-4-chlorobenzothiazole) in 40 parts of 85% phosphoric acid is cooled to —5° C. A solution of 0.7 part of sodium nitrite in 10 parts of water is added slowly and the resulting mixture stirred at —5° C. for 2 hours. The diazotization mixture is then added to a cold solution of 2.45 parts of [2-(N-ethylanilino)ethyl]trimethylammonium chloride in 15 parts of water, while keeping the temperature at 0°–2° C. After stirring 2 hours at 0°–2° C., the acidity of the reaction mixture is reduced to pH 4 by addition of 15% caustic, and the agitation is continued for 10 hours at room temperature. The precipitated dye is filtered off, washed with a 20% aqueous solution of monosodium phosphate and dried.

The product thus obtained has the structure

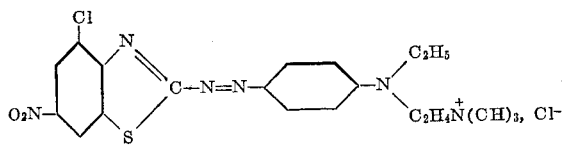

It is a dark brown powder, which dissolves in water giving a bluish-red solution. The absorption maximum in methanol is located at 530 millimicrons.

It dyes acid-modified acrylic fiber in bright violet shades of good dyeing and fastness properties. Following the dyeing procedure of Example IV, time of half-dyeing ($T/2$) is 23 minutes. The shade of this dye on acrylic fiber does not change by varying the pH of the dyebath from 2 to 10.

(b) When the coupling component in this example is replaced with a chemical equivalent of 3'-[(2-diethylaminoethyl)methylamino]-p-acetanisidide a blue dye of similar fastness and dyeing properties is obtained. It is applied to acrylic fiber by the conventional acidic dyebath method or by the procedure described in Example VIII.

Example VII (a) A solution of 1.84 parts of 2-amino-6-chlorobenzothiazole in phosphoric acid is diazotized as described in Example V. The diazotization mixture is then added to a chemical equivalent amount of a cold solution of [2-(N-ethylanilino)ethyl]trimethylammonium chloride in water while keeping the temperature at 0°–2° C. Agitation and isolation of the product is carried out as in Example V. The dye thus obtained has the structure:

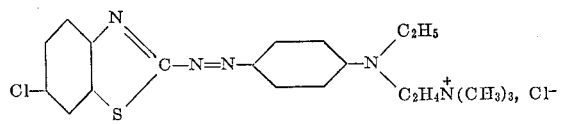

It is a red powder. The absorption maximum in methanol is located at 492 millimicrons.

(b) When the coupling component in this example is replaced with a chemical equivalent amount of N,N,N'-triethyl-N'-phenylethylenediamine the isolation of the obtained dye is carried out as described in Example V. The dye is then dissolved in water, and the solution made alkaline to pH 9 with concentrated ammonium hydroxide solution. The precipitate is filtered off, washed and dried.

The obtained dye has the structure:

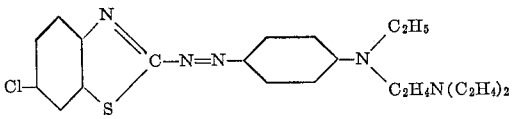

It is a red powder, which dissolves in dilute hydrochloric acid to give a red solution. It dyes acid-modified acrylic fiber by the method described in Example VIII giving bright red shades of good dyeing and fastness properties.

Example VIII (a) One part of a woven fabric composed of acid-modified ($SO_3Na$ form) polyacrylic staple fiber is treated for 30 minutes at 88° C. in a bath containing 40 parts of water and 0.8 part of ammonium sulfate. The fabric thus obtained in its ammonium sulfonate form is rinsed thoroughly in water, and dried.

(b) The dried fabric from part (a) is passed through a padding bath consisting of a dye dispersion prepared by mixing 6 g./l. of the finely divided dye of Example VII (b), nonionic dispersant (the condensation product of 20 mole of ethylene oxide with 1 mole of $C_{18}$ alcohol) to provide a dispersant concentration of 3 g./l., and sodium hydroxide as necessary to provide a pH of 8.5. The wet fabric is squeezed between rolls so as to retain 75% of its dry weight of the padding bath liquor. The fabric is dried and then heated in a circulating hot air oven at 210° C. for 90 seconds. The dye fabric is rinsed in water, scoured to remove unfixed dye, and finally dried. A bright, clear red dyeing having excellent fastness to light, washing and sublimation is obtained.

Other substituted 2-aminobenzothiazoles useful as diazo components in this invention are the following:

2-amino-4-chlorobenzothiazole
2-amino-4-bromobenzothiazole
2-amino-4-nitrobenzothiazole
2-amino-4-cyanobenzothiazole
2-amino-6-bromobenzothiazole
2-amino-6-cyanobenzothiazole
2-amino-6-nitrobenzothiazole
2-amino-6-(trifluoromethyl)benzothiazole
6-acetyl-2-aminobenzothiazole
2-amino-6-(trifluoroacetyl)benzothiazole
2-amino-6-valerylbenzothiazole
2-amino-6-(beta-hydroxypropionyl)benzothiazole
2-amino-6-(cyclohexylcarbonyl)benzothiazole
2-amino-6-p-toluoylbenzothiazole
2-amino-6-(o-chlorobenzoyl)benzothiazole
2-amino-6-(p-bromobenzoyl)benzothiazole
2-amino-6-(m-nitrobenzoyl)benzothiazole
2-amino-6-(methylsulfonyl)benzothiazole
2-amino-6-(2-hydroxyethylsulfonyl)benzothiazole
2-amino-6-(propylsulfonyl)benzothiazole
2-amino-6-(cyclohexylsulfonyl)benzothiazole
2-amino-6-(phenylsulfonyl)benzothiazole
2-amino-6-(o-tolylsulfonyl)benzothiazole
2-amino-6-(m-chlorophenylsulfonyl)benzothiazole
2-amino-6-(p-bromophenylsulfonyl)benzothiazole
2-amino-6-(m-nitrophenylsulfonyl)benzothiazole
2-amino-6-(ethoxycarbonyl)benzothiazole
2-amino-6-(butoxycarbonyl)benzothiazole
2-amino-6-(trifluoromethylsulfonyl)benzothiazole
2-amino-4-bromo-6-nitrobenzothiazole
2-amino-4,6-dinitrobenzothiazole
2-amino-4,6-dicyanobenzothiazole
2-amino-6-bromo-4-methylbenzothiazole
2-amino-4-methoxy-6-nitrobenzothiazole
2-amino-6-bromo-4-propoxybenzothiazole
2-amino-4-cyano-6-nitrobenzothiazole
2-amino-6-chloro-4-cyanobenzothiazole
2-amino-6-chloro-4-nitrobenzothiazole
2-amino-6-bromo-4-cyanobenzothiazole
2-amino-6-cyano-4-methylbenzothiazole
2-amino-6-methyl-4-nitrobenzothiazole
2-amino-6-methoxy-4-nitrobenzothiazole
2-amino-6-butoxy-4-chlorobenzothiazole
2-amino-4-chloro-6-methoxybenzothiazole
2-amino-4-bromo-6-methoxybenzothiazole
2-amino-4,6-dichlorobenzothiazole
2-amino-4,6-dibromobenzothiazole
2-amino-4-methyl-6-(trifluoromethyl)benzothiazole
2-amino-4-methyl-6-propionylbenzothiazole
2-amino-4-chloro-6-(methylsulfonyl)benzothiazole
2-amino-6-(methylsulfamoyl)-4-nitrobenzothiazole
2-amino-4-chloro-6-(cyclohexylsulfonyl)benzothiazole
2-amino-4-bromo-6-(ethylsulfonyl)benzothiazole
2-amino-N,N-dimethyl-4-nitro-6-benzothiazolesulfonamide
2-amino-N-benzyl-4-chloro-N-ethyl-6-benzothiazolesulfonamide
2-amino-4-bromo-N-ethyl-6-benzothiazolesulfonanilide
2-amino-N,N-dipropyl-4-methyl-6-benzothiazolesulfonamide
2-amino-4-chloro-6-(methoxycarbonyl)benzothiazole
2-amino-4-bromo-6-(butoxycarbon)benzothiazole It will be understood that any of the diazo components disclosed herein may be coupled with any of the coupling components used in this invention to provide monoazo dyes of the cationic and basic dye base types which range in shade from orange to blue and are useful in dyeing anionic fibers.

The following is a list of additional coupling components:

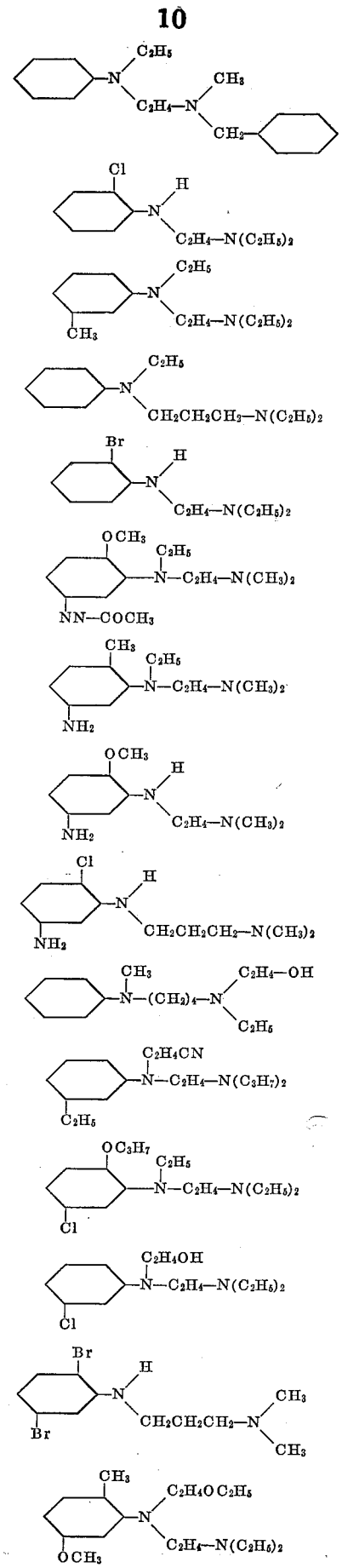

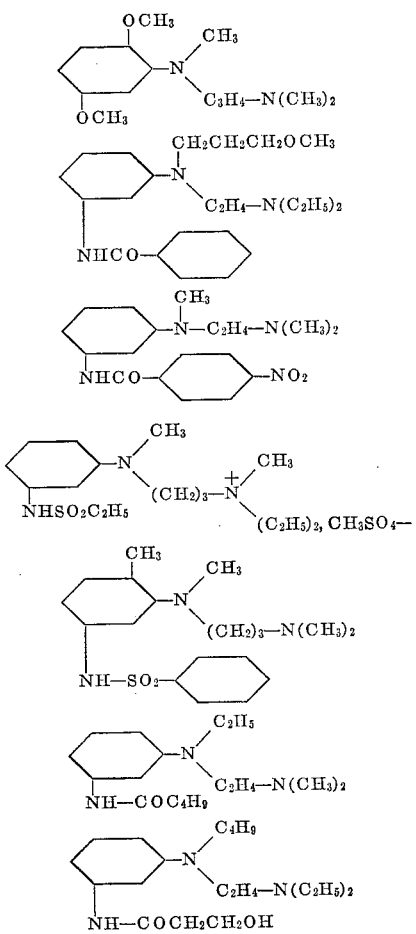

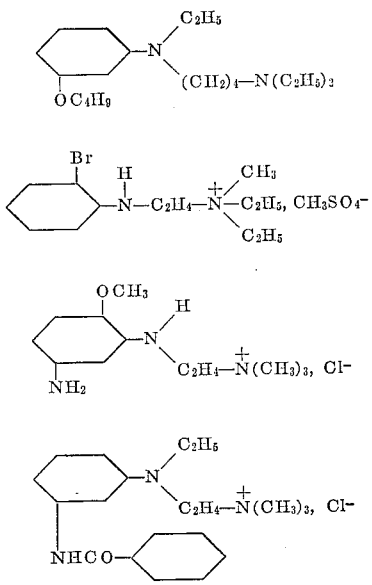

Any of the above disclosed pendant teritary amine coupling components may be coupled with the diazo compounds to form dyes for anionic fibers, or these couplers may first be converted to their quaternary ammonium derivatives, as described below with reference to the coupler of Example II, and then coupled to the diazos to provide cationic dyes.

Dyes representative of those included in the present invention are listed in Table I wherein substituents identified by letters at the top of the columns correspond with those shown in structure (I) and in the definitions which follow said structure. There are no values for $R_8$ and $A^-$ in the case of the basic dye bases. The last column shows the color of the dye on polyacrylic fiber.

TABLE I

| Ex. | A | B | X | Y | $R_3$ | $R_4$ | $R_6$ | $R_7$ | $R_8$ | $A^-$ | Color |
|---|---|---|---|---|---|---|---|---|---|---|---|
| (a) | $CH_3SO_2$ | H | H | H | $C_2H_5$ | $C_2H_4$ | $C_2H_5$ | $C_2H_5$ | | | Red. |
| (b) | $CH_3SO_2$ | H | H | H | $C_2H_5$ | $C_2H_4$ | $CH_3$ | $CH_3$ | $CH_3$ | $Cl^-$ | Red. |
| (c) | $CH_3SO_2$ | H | Cl | H | H | $C_2H_4$ | $C_2H_5$ | $C_2H_5$ | | | Orange. |
| (d) | $HOC_2H_4SO_2$ | H | H | $CH_3$ | $C_2H_5$ | $C_2H_4$ | $CH_3$ | $CH_3$ | $CH_3$ | $Cl^-$ | Red. |
| (e) | $HOC_2H_4SO_2$ | H | Cl | H | H | $C_2H_4$ | $C_2H_5$ | $C_2H_5$ | | | Orange. |
| (f) | $C_6H_5SO_2$ | H | H | H | $C_2H_5$ | $C_2H_4$ | $CH_3$ | $CH_3$ | $CH_3$ | $Cl^-$ | Red. |
| (g) | $C_6H_5SO_2$ | H | H | $CH_3$ | $C_2H_5$ | $C_2H_4$ | $C_2H_5$ | $C_2H_5$ | | | Blue-red. |
| (h) | $C_6H_5SO_2$ | H | H | H | $C_2H_5$ | $C_2H_4$ | $C_2H_5$ | $C_2H_5$ | | | Do. |
| (i) | $C_6H_5SO_2$ | H | H | H | $C_2H_5$ | $C_2H_4$ | $C_2H_5$ | $C_2H_5$ | | | Do. |
| (j) | $C_6H_5SO_2$ | H | H | H | $C_2H_5$ | $(CH_2)_3$ | $C_2H_5$ | $C_2H_5$ | | | Do. |
| (k) | $HOC_2H_4$<br>$\diagdown N-SO_2$<br>$HOC_2H_4\diagup$ | H | Cl | H | H | $C_2H_4$ | $C_2H_5$ | $C_2H_5$ | | | Orange. |
| (l) | $HOC_2H_4$<br>$\diagdown N-SO_2$<br>$HOC_2H_4\diagup$ | H | H | H | $C_2H_5$ | $C_2H_4$ | $CH_3$ | $CH_3$ | $CH_3$ | $Cl^-$ | Red. |
| (m) | $CH_3CO$ | H | H | H | $C_2H_5$ | $C_2H_4$ | $CH_3$ | $CH_3$ | $CH_3$ | $Cl^-$ | Blue-red. |
| (n) | $C_6H_5CO$ | H | H | $CH_3$ | $C_2H_5$ | $C_2H_4$ | $CH_3$ | $C_2H_5$ | $C_2H_5$ | $CH_3SO_4^-$ | Do. |
| (o) | $C_6H_5CO$ | H | H | H | $C_2H_5$ | $C_2H_4$ | $C_2H_5$ | $C_2H_5$ | | | Red. |
| (p) | Cl | H | H | $CH_3$ | $C_2H_5$ | $C_2H_4$ | $C_2H_5$ | $C_2H_5$ | | | Red. |
| (q) | $NO_2$ | H | H | H | $C_2H_5$ | $C_2H_4$ | $CH_3$ | $CH_3$ | $CH_3$ | $Cl^-$ | Blue-red. |
| (r) | H | H | Cl | H | $C_2H_5$ | $C_2H_4$ | $CH_3$ | $CH_3$ | $CH_3$ | $Cl^-$ | Red. |
| (s) | $NO_2$ | $OCH_3$ | H | H | $C_2H_5$ | $C_2H_4$ | $CH_3$ | $CH_3$ | $CH_3$ | $Cl^-$ | Blue-red. |
| (t) | $NO_2$ | Cl | H | H | H | $C_2H_4$ | $CH_3$ | $CH_3$ | $CH_3$ | Cl | Scarlet. |
| (u) | $NO_2$ | Cl | $OCH_3$ | $CH_3$ | H | $C_2H_4$ | $CH_3$ | $C_2H_5$ | $C_2H_5$ | $CH_3SO_4^-$ | Violet. |
| (v) | Cl | H | H | $C_2H_5$ | $C_2H_5$ | $C_2H_4$ | $C_2H_5$ | $C_2H_5$ | | | Red. |
| (w) | CN | $CH_3$ | Br | H | H | $C_2H_4$ | $C_2H_5$ | $C_2H_5$ | | | Blue-red. |
| (x) | $CF_3$ | H | $OC_3H_7$ | Cl | $C_2H_5$ | $C_2H_4$ | $CH_3$ | $CH_3$ | | | Violet. |
| (y) | $CH_3OCO$ | Cl | $CH_3$ | $NH_2$ | $C_2H_5$ | $C_2H_4$ | $C_2H_5$ | $C_2H_5$ | | | Red. |
| (z) | $CH_3CH_2CO$ | H | H | $NHCOCH_2CH_3$ | $C_4H_9$ | $C_2H_4CN$ | $C_2H_5$ | $C_2H_5$ | | | Blue-red. |
| (aa) | $m-NO_2C_6H_4CO$ | H | H | $C_2H_5$ | $C_2H_5$ | $C_2H_4$ | $C_3H_7$ | $C_3H_7$ | | | Red. |
| (bb) | $p-BrC_6H_4SO_2$ | H | H | $NH-COCF_3$ | $CH_3$ | $C_2H_4$ | $C_2H_5$ | $C_2H_5$ | | | Blue-red. |
| (cc) | $C_4H_9O$ | Cl | $OCH_3$ | $CH_3$ | $C_2H_4OC_2H_5$ | $(CH_2)_4$ | $C_2H_5$ | $C_2H_5$ | | | Red. |
| (dd) | $CH_3$ | $NO_2$ | H | $OC_4H_9$ | $C_2H_5$ | $C_2H_4$ | $C_2H_5$ | $C_2H_5$ | | | Blue-red. |
| (ee) | $NO_2$ | $NO_2$ | H | $NH-COC_6H_5$ | $CH_2CH_2CH_2OCH_3$ | $C_2H_4$ | $CH_3$ | $CH_3$ | | | Blue. |
| (ff) | Cl | $NO_2$ | $OCH_3$ | $NHCOCH_3$ | H | $C_2H_4$ | $CH_3$ | $CH_3$ | | | Blue-red. |
| (gg) | $(CH_3)_2N-SO_2$ | $NO_2$ | $OCH_3$ | $NH_2$ | H | $C_2H_4$ | $CH_3$ | $CH_3$ | | | Do. |
| (hh) | Br | CN | H | Cl | $C_2H_4OH$ | $C_2H_4$ | $C_2H_5$ | $C_2H_5$ | | | Red. |
| (ii) | Br | $OC_3H_7$ | $OC_2H_5$ | $OC_2H_5$ | $CH_3$ | $(CH_2)_3$ | $CH_3$ | $C_2H_5$ | $C_2H_5$ | $CH_3SO_4^-$ | Red. |
| (jj) | $CH_3O$ | Br | Cl | Cl | H | $C_2H_4$ | $CH_3$ | $C_2H_5$ | $C_2H_5$ | $CH_3SO_4^-$ | Red. |

The diazo components which are used in this invention are either known compounds as disclosed in the patents, British 896,232, U.S. 2,980,666, U.S. 3,057,848, U.S. 3,084,153 and U.S. 3,105,829, or they may be prepared by known methods.

The coupling components which are used in this invention are either known compounds or may be prepared by known methods. For instance, the coupling component used in Example I(a), [2-(N-ethylanilino)ethyl]trimethylammonium chloride, may be prepared by reacting N-ethyl(N-2-hydroxyethyl)aniline with phosphorus oxychloride to produce the corresponding N-2-chloroethyl compound, and then reacting the latter with trimethylamine to produce the quaternary compound. The coupling component employed in Example II [2-(o-chloroanilino)ethyl]diethylmethylammonium methosulfate, may be prepared by alkylating the diamine of formula:

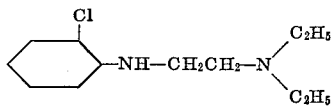

with dimethyl sulfate. The various other cationic coupling components named in this specification may be prepared by one or the other of the above procedures, depending on whether their anionic member is the chloride or the methosulfate ion. Other alkylating agents that may be used are diethyl sulfate, methyl or ethyl p-toluenesulfonate, etc.

The pendant tertiary amino couplers used in this invention may be prepared from aryl amines by the method described by Meuly in U.S. Patent No. 3,121,115, issued Feb. 11, 1964.

Since it is obvious that many changes and modifications can be made in the above-described details without departing from the nature and spirit of the invention, it is to be understood that the invention is not to be limited to said details except as set forth in the appended claims.

The embodiments of the invention in which an exclusive property or privilege is claimed are defined as follows:

1. A monoazo dye of the formula

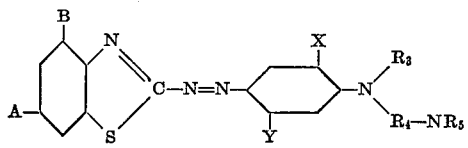

wherein

A is a member of the group consisting of H, $CH_3$, lower alkoxy, Cl, Br, $NO_2$, CN, $CF_3$, R—CO—, R—$SO_2$—, $R_1R_2NSO_2$— and lower alkyl-O—CO— with the proviso that when B is H, $CH_3$, or lower alkoxy then A is a member of the group consisting of Cl, Br, $NO_2$, CN, $CF_3$, R—CO—, R—$SO_2$—, $R_1R_2NSO_2$— and lower alkyl-O—CO—;

R is a member of the group consisting of lower alkyl, $CF_3$, cyclohexyl, 2-hydroxyethyl, and phenyl which may be substituted with Cl, Br, $NO_2$, and lower alkyl;

$R_1$ is a member of the group consisting of H, lower alkyl, and 2-hydroxyethyl;

$R_2$ is a member of the group consisting of lower alkyl, 2-hydroxyethyl, benzyl, and phenyl radical;

B is a member of the group consisting of H, $CH_3$, lower alkoxy, Cl, Br, $NO_2$ and CN with the proviso that when A is H, $CH_3$ or lower alkoxy then B is a member of the group consisting of Cl, Br, $NO_2$ and CN;

X is a member of the group consisting of H, Cl, Br, $CH_3$, $C_2H_5$, and lower alkoxy;

Y is a member of the group consisting of $NH_2$, H, Cl, Br, $CH_3$, $C_2H_5$, lower alkoxy, QCONH— and $QSO_2NH$—, wherein Q is a member of the group consisting of lower alkyl, or phenyl which may be substituted with Cl, Br, $NO_2$, and lower alkyl; with the proviso that when Y is $NH_2$ then X is a member of the group consisting of Cl, Br, $CH_3$, $C_2H_5$, and lower alkoxy;

$R_3$ is a member of the group consisting of H, lower alkyl, 2-hydroxyethyl, 2-cyanoethyl and lower alkoxyalkyl;

$R_4$ is an alkylene radical of 2 to 4 C-atoms;

$NR_5$ represents a member selected from the group consisting of

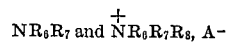

wherein $R_6$ is a member of the group consisting of lower alkyl, 2-hydroxyethyl, and benzyl;

$R_7$ is a member of the group consisting of lower alkyl, 2-hydroxyethyl, and benzyl;

$R_8$ is a member of the group consisting of lower alkyl, 2-hydroxyethyl, and benzyl;

$A^-$ is a water-solubilizing anion of the group consisting of chloride, bromide, lower alkyl sulfate, zinc trichloride, p-toluene sulfonate, and $H_2PO_4^-$ ions.

2. The azo dye of the formula:

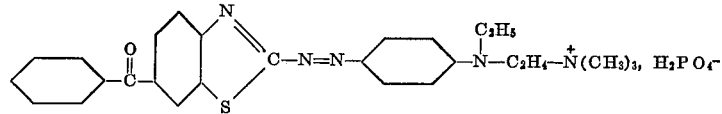

3. The azo dye of the formula:

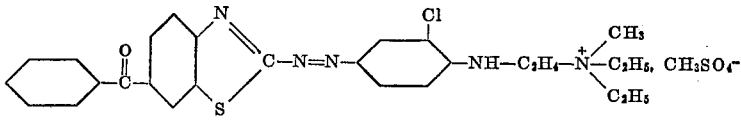

4. The azo dye of the formula:

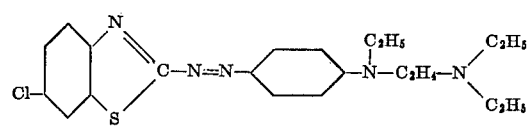

5. The azo dye of the formula:

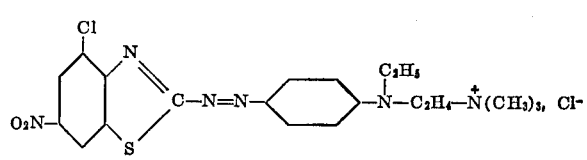

6. The azo dye of the formula:

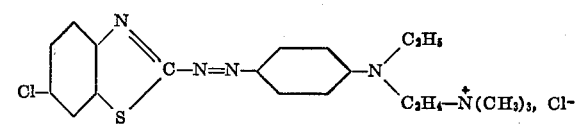

References Cited

UNITED STATES PATENTS 2,238,485    4/1941    Dickey et al. _____ 260—158

CHARLES B. PARKER, *Primary Examiner.*

D. M. PAPUGA, *Assistant Examiner.*